April 20, 1948.  E. H. LAND  2,440,104
LIGHT POLARIZING VIEWER FOR USE IN CONNECTION
WITH STEREOSCOPIC PICTURES
Original Filed March 13, 1942

INVENTOR.
Edwin H. Land
BY
Donald L. Brown
Attorney

Patented Apr. 20, 1948

2,440,104

UNITED STATES PATENT OFFICE 2,440,104

LIGHT POLARIZING VIEWER FOR USE IN CONNECTION WITH STEREOSCOPIC PICTURES

Edwin H. Land, Cambridge, Mass., assignor to Polaroid Corporation, Cambridge, Mass., a corporation of Delaware Original application March 13, 1942, Serial No. 434,567. Divided and this application February 24, 1945, Serial No. 579,605

6 Claims. (Cl. 88—29)

This invention relates to viewing devices, and more particularly to viewing devices such as are described, in combination with theatre admission tickets, in my co-pending application Serial No. 434,567, filed March 13, 1942 (now Patent No. 2,416,528, issued February 25, 1947), for Combined ticket strip and viewing visor, of which application the present case is a division.

An object of the invention is to provide a viewing device for use in connection with the viewing of stereoscopic pictures projected in polarized light.

Other objects of the invention are to provide such a viewing device which comprises a plurality of light-polarizing areas, one positioned before each eye of an observer; to provide such a viewing device comprising an optically anisotropic transparent strip folded upon itself to provide two angularly positioned portions each adapted to form at least part of an eye-covering portion of the viewer; to provide such a viewing device in which the polarizing axes of the aforesaid areas are substantially at right angles to each other; to provide such a device in which the said polarizing axes of the polarizing areas are at angles of approximately 45 degrees with a line joining the centers of said areas; to provide such a device which may be used as a viewing device from either side without alteration in the stereoscopic effect produced; to provide such a viewing device as one of a multiplicity of such devices in a strip or roll thereof; and to provide such a multiplicity of viewing devices provided therebetween with heavily perforated or scored sections which enable the viewing devices to be separated from each other.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

Figure 1:
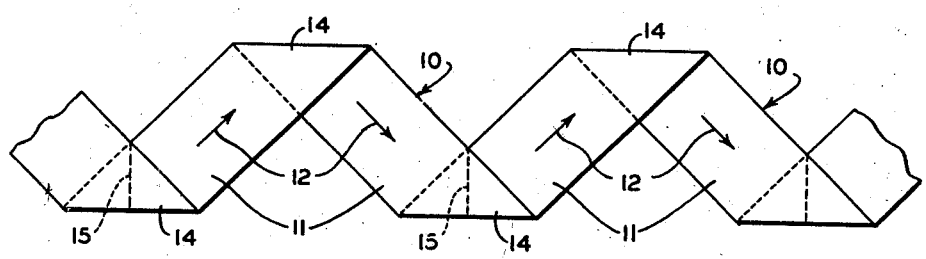
Figure 2:
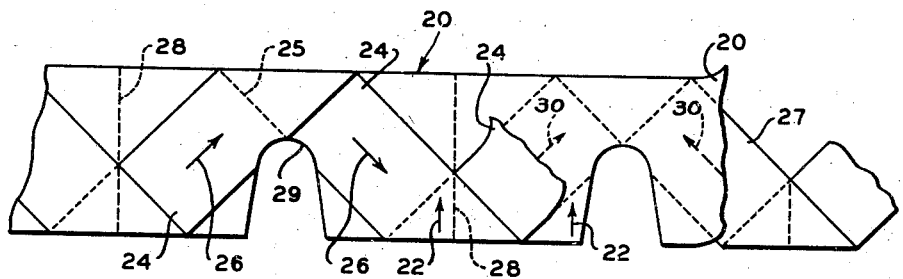

For a fuller understanding of the invention, reference should be had to the following detailed description, taken in connection with the accompanying drawings, wherein:

Figure 1 represents diagrammatically and in plan a portion of a strip comprising a plurality of viewing devices embodying one form of the present invention; and Fig. 2 is a similar view of a portion of a strip comprising a plurality of viewing devices embodying a different form of the invention.

The use of polarized light in connection with the projection and viewing of stereoscopic images, and more particularly in connection with the projection and viewing of stereoscopic motion pictures, has heretofore been suggested. Such systems generally have been described in several previously issued United States Letters Patent and are explained in greater detail in the patent to Land and Mahler, No. 2,203,687, issued June 11, 1940, for Apparatus employing polarized light for the production of stereoscopic images, and in the patent to Land, No. 2,099,694, issued November 23, 1937, for Polarizing optical system. Various forms of devices have been suggested. In one form circularly polarized light is employed. In another the light rays carrying each image vibrate at angles of substantially 45 degrees to the horizontal and at right angles to each other. The present invention is intended for use in connection with both these methods of projection.

In the embodiment of the invention shown in Fig. 1, the strip is made up of a single, fairly heavy, self-supporting sheet or strip of light-polarizing material 10, which may advantageously comprise one of the light-polarizing materials sold under the trade name "Polaroid." The polarizing axis of this material may run lengthwise of the strip 10, as indicated by arrows 12, or it may be perpendicular thereto. The strip is folded upon itself, as for example along the lines 14, to provide a succession of inclined areas 11 extending substantially at 90 degrees to each other, each area being a light-polarizing area and the polarizing axes of successive areas being substantially at right angles to each other. Heavy score lines 15 may be provided intermediate adjacent pairs of these polarizing areas so that the strip may be separated into a plurality of viewing units by tearing along the score lines. The overlying portions of the strip, for example the portions adjacent fold lines 14, may be adhesively bonded together in any well known manner in order to effect a more compact and unitary structure. Under these circumstances, the unit lying between successive score lines 15, with the centers of the inclined areas thereof positioned at substantially the average interocular distance from each other, is adapted to function as a viewing device for stereoscopic pictures, where the right-eye and left-eye images are formed respectively in plane polarized light, vibrating perpendicularly to the light carrying the other image, and at 45 degrees to the horizontal.

In Fig. 2, there is shown a further modification of the invention which is adapted, for example, for use in connection with the projection of stereoscopic images in circularly polarized light where one image is given a clockwise circular polarization and the other a counterclockwise circular polarization. In the form of the device shown in Fig. 2, the viewing device may comprise a three-ply lamination. The central ply 20 may be a sheet of light-polarizing material, such as one of the polarizing materials sold under the trade name "Polaroid," or any other suitable sheet-like light-polarizing material, and it may have its polarizing axis positioned preferably either perpendicularly to its length, as shown for example by arrows 22, or parallel with its length.

In Fig. 2, the entire face of the polarizing sheet 20 may be laminated as shown to a quarter-wave retardation device, for example a strip 24 of strained cellulose acetate or quarter-wave Cellophane. Strip 24 should be folded upon itself in the same manner as strip 10 in Fig. 1, as indicated by dotted lines 25, or otherwise so arranged that its principal optical direction over one eye of an observer is at an angle of 45 degrees to the axis 22 of polarizing material 20. The principal optical direction of strip 24 is designated by arrows 26, which lie at angles of substantially 90 degrees to each other. This change in direction is accomplished by the folding of the strip.

The other face of sheet 20 may be similarly covered with a similar quarter-wave strip 27, as indicated in the right-hand portion of Fig. 2. The principal optical direction of quarter-wave strip 27 is indicated by arrows 30, which also lie at angles of substantially 90 degrees to each other.

Polarizing sheet 20 is preferably pre-sheeted so that when the quarter-wave strip is bonded thereto, there is centrally disposed between alternate folds in element 24, and adjacent one edge of the viewing device, an aperture which is adapted to fit over the nose of a person using the device, as shown for example at 29 in Fig. 2. It will be understood, moreover, that nose aperture 29 may be of any desired shape besides that shown, and that, if desired, polarizing sheet 20 may be cut to the same shape as quarter-wave strips 24 and 27.

The separate units of the device may be separated from each other by tearing along the heavily scored lines 28 so as to provide a series of successive viewing devices.

In the form of the device shown in Fig. 2, the elements 20, 24 and 27 may be bonded together in ways known to the art, for example where the polarizer comprises cellulose acetate, with oriented polarizing particles suspended therein, by applying a common solvent to the surfaces of the quarter-wave and polarizing materials which are in contact.

It will be understood that in the operation of the device shown in Fig. 2, the quarter-wave device which lies on the outer side of sheet 20 acts in conjunction with that sheet to convert the viewing device into circularly polarizing viewing means suitable for use in connection with three dimensional images formed in clockwise and counterclockwise circularly polarized light, whereas the quarter-wave device lying intermediate the polarizing sheet and the eyes of the observer has no effect upon the function of the device, except to make it useful from either side.

It should be noted that a similarly operating device may be made similar to the device shown in Fig. 2, by utilizing for sheet 20 a material which will act as a quarter-wave device, with its principal optical direction at right angles to the horizontal. Strip 24, which in this modification of the invention may comprise a strip of light-polarizing material, such as one of the polarizing materials sold under the trade name "Polaroid," the axis of which may be parallel with or perpendicular to its length, may be laminated to sheet 20 after having been folded upon itself in the same manner as quarter-wave strip 24 in Fig. 2. By laminating a second quarter-wave sheet, such as sheet 20 in Fig. 2, to the outer side of polarizing strip 24, the device may be made operative from either side.

It will be noted that the viewing devices described may be employed by an observer with either surface adjacent the eyes, for reversal of the device, so that the observer looks through the opposite surface, causes no alteration in the relative positions of the axes of the various elements. The entire device is light, thin, easily handled, easily assembled, and cheap. There is no need to instruct the user as to how the device is to be handled, or how it is to be used, whereas with devices of the same general type that have heretofore been employed it is possible for the observer to look through the devices from one surface only without losing the stereoscopic effect which is desired.

In the modifications of the invention described above there is provided an optically anisotropic sheet or strip, either a polarizer or a quarter-wave sheet, which is so folded upon itself as to provide in each viewer a plurality of angularly positioned areas with their corresponding axes positioned at substantially 90 degrees to each other, one area being positioned before each eye of a wearer of the device.

Since certain changes may be made in the above article and different embodiments of the invention could be made without departing from the scope thereof, it is intended that all matter contained in the above description or shown in the accompanying drawings shall be interpreted as illustrative and not in a limiting sense.

What is claimed is:

1. A viewing visor comprising a strip of light-polarizing material the longitudinal dimension of which is substantially in excess of the width dimension, said strip having a transmission axis bearing a predetermined relation to said longitudinal dimension and having therein a fold providing a plurality of diverging viewing portions adjacent said fold and also providing an interconnecting portion for said viewing portions, said interconnecting portion consisting of a section of superimposed layers of said strip, said fold causing said transmission axis in one viewing portion to be substantially perpendicular to said transmission axis in the other viewing portion whereby each said viewing portion is adapted to block substantially polarized light transmitted by the other viewing portion, said viewing portions being separated from each other by substantially the average interocular distance, said viewing visor being characterized by the fact that either face thereof may be used as the viewing face without alteration of the stereoscopic effect produced.

2. A viewing visor comprising a strip of light-polarizing material the longitudinal dimension of which is substantially in excess of the width dimension, said strip having a transmission axis parallel with said longitudinal dimension and having therein a fold providing a plurality of diverging viewing portions adjacent said fold and also providing an interconnecting portion for said viewing portions, said interconnecting portion consisting of a section of superimposed layers of said strip, said fold causing said transmission axis in one viewing portion to be substantially perpendicular to said transmission axis in the other viewing portion whereby each said viewing portion is adapted to block substantially polarized light transmitted by the other viewing portion, said viewing portions being separated from each other by substantially the average interocular distance, said viewing visor being characterized by the fact that either face thereof may be used as the viewing face without alteration of the stereoscopic effect produced.

3. A viewing visor comprising a strip of light-polarizing material the longitudinal dimension of which is substantially in excess of the width dimension, said strip having a transmission axis perpendicular to said longitudinal dimension and having therein a fold providing a plurality of diverging viewing portions adjacent said fold and also providing an interconnecting portion for said viewing portions, said interconnecting portion consisting of a section of superimposed layers of said strip, said fold causing said transmission axis in one viewing portion to be substantially perpendicular to said transmission axis in the other viewing portion whereby each said viewing portion is adapted to block substantially polarized light transmitted by the other viewing portion, said viewing portions being separated from each other by substantially the average interocular distance, said viewing visor being characterized by the fact that either face thereof may be used as the viewing face without alteration of the stereoscopic effect produced.

4. A viewing visor comprising, in combination, a strip of light-polarizing material the longitudinal dimension of which is substantially in excess of the width dimension, said strip having a transmission axis bearing a predetermined relation to said longitudinal dimension and having therein a fold providing a plurality of diverging viewing portions adjacent said fold and also providing an interconnecting portion for said viewing portions, said interconnecting portion consisting of a section of superimposed layers of said strip, said fold causing said transmission axis in one viewing portion to be substantially perpendicular to said transmission axis in the other viewing portion, a sheet of transparent quarter-wave material so superimposed upon and affixed to said light-polarizing strip that the principal optical direction of said quarter-wave sheet is positioned at an angle of substantially 45 degrees to each of said transmission axes, and a second, similar, transparent, quarter-wave sheet superimposed upon and affixed to the surface of said light-polarizing strip opposite that to which the first-mentioned quarter-wave sheet is affixed, said light-polarizing strip and one of said quarter-wave sheets cooperating to circularly polarize a beam of light transmitted by said viewing portions, said viewing portions being separated from each other by substantially the average interocular distance, said viewing visor being characterized by the fact that either face thereof may be used as the viewing face without alteration of the stereoscopic effect produced.

5. A viewing visor comprising, in combination, a strip of light-polarizing material the longitudinal dimension of which is substantially in excess of the width dimension, said strip having a transmission axis parallel with said longitudinal dimension and having therein a fold providing a plurality of diverging viewing portions adjacent said fold and also providing an interconnecting portion for said viewing portions, said interconnecting portion consisting of a section of superimposed layers of said strip, said fold causing said transmission axis in one viewing portion to be substantially perpendicular to said transmission axis in the other viewing portion, a sheet of transparent quarter-wave material so superimposed upon and affixed to said light-polarizing strip that the principal optical direction of said quarter-wave sheet is positioned at an angle of substantially 45 degrees to each of said transmission axes, and a second, similar, transparent, quarter-wave sheet superimposed upon and affixed to the surface of said light-polarizing strip opposite that to which the first-mentioned quarter-wave sheet is affixed, said light-polarizing strip and one of said quarter-wave sheets cooperating to circularly polarize a beam of light transmitted by said viewing portions, said viewing portions being separated from each other by substantially the average interocular distance, said viewing visor being characterized by the fact that either face thereof may be used as the viewing face without alteration of the stereoscopic effect produced.

6. A viewing visor comprising, in combination, a strip of light-polarizing material the longitudinal dimension of which is substantially in excess of the width dimension, said strip having a transmission axis perpendicular to said longitudinal dimension and having therein a fold providing a plurality of diverging viewing portions adjacent said fold and also providing an interconnecting portion for said viewing portions, said interconnecting portion consisting of a section of superimposed layers of said strip, said fold causing said transmission axis in one viewing portion to be substantially perpendicular to said transmission axis in the other viewing portion, a sheet of transparent quarter-wave material so superimposed upon and affixed to said light-polarizing strip that the principal optical direction of said quarter-wave sheet is positioned at an angle of substantially 45 degrees to each of said transmission axes, and a second, similar, transparent, quarter-wave sheet superimposed upon and affixed to the surface of said light-polarizing strip opposite that to which the first-mentioned quarter-wave sheet is affixed, said light-polarizing strip and one of said quarter-wave sheets cooperating to circularly polarize a beam of light transmitted by said viewing portions, said viewing portions being separated from each other by substantially the average interocular distance, said viewing visor being characterized by the fact that either face thereof may be used as the viewing face without alteration of the stereoscopic effect produced.

EDWIN H. LAND.

REFERENCES CITED

The following references are of record in the file of this patent:

UNITED STATES PATENTS

| Number | Name | Date |
| --- | --- | --- |
| 2,099,694 | Land | Nov. 23, 1937 |
| 2,218,875 | Parsell | Oct. 22, 1940 |
| 2,285,792 | Bailey | June 9, 1942 |
| 2,313,831 | Martin | Mar. 16, 1943 |
| 2,323,518 | Cochran | July 6, 1943 |
| 2,337,617 | Miller | Dec. 28, 1943 |

FOREIGN PATENTS

| Number | Country | Date |
| --- | --- | --- |
| 517,924 | Great Britain | Feb. 13, 1940 |
| 834,855 | France | Sept. 5, 1938 |
| 841,943 | France | Feb. 20, 1939 |